US012649381B2

(12) United States Patent (10) Patent No.: US 12,649,381 B2
Ogaki (45) Date of Patent: Jun. 9, 2026

(54) CHARGING CONTROL DEVICE AND CHARGING CONTROL METHOD

(71) Applicant: HONDA MOTOR CO., LTD., Tokyo (JP)

(72) Inventor: Toru Ogaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 686 days.

(21) Appl. No.: 18/102,340

(22) Filed: Jan. 27, 2023

(65) Prior Publication Data

US 2023/0249576 A1 Aug. 10, 2023

(30) Foreign Application Priority Data

Feb. 4, 2022 (JP) ................................. 2022-016700

(51) Int. Cl.
*B60L 53/68* (2019.01)
*B60L 53/30* (2019.01)
*H02J 7/40* (2026.01)

(52) U.S. Cl.
CPC ............. *B60L 53/68* (2019.02); *B60L 53/305* (2019.02); *H02J 7/40* (2026.01)

(58) Field of Classification Search
CPC ........ B60L 53/68; B60L 53/305; B60L 53/14; B60L 53/60; B60L 53/66; B60L 58/10; H02J 7/00032; H02J 7/00
See application file for complete search history.

(56) References Cited

U.S. PATENT DOCUMENTS

| | | | | |
|---|---|---|---|---|
| 5,305,613 A | * | 4/1994 | Hotta | B60L 50/51 |
| | | | | 62/236 |
| 5,656,916 A | * | 8/1997 | Hotta | B60L 50/51 |
| | | | | 320/109 |
| 2009/0143929 A1 | * | 6/2009 | Eberhard | B60L 3/0046 |
| | | | | 903/907 |
| 2012/0062168 A1 | | 3/2012 | Kobayashi et al. | |

(Continued)

FOREIGN PATENT DOCUMENTS

| | | | | |
|---|---|---|---|---|
| CN | 103098340 A | | 5/2013 | |
| CN | 110015103 A | * | 7/2019 | B60L 53/665 |

(Continued)

OTHER PUBLICATIONS

Machine translation of CN-110015103-A (Year: 2025).*

(Continued)

*Primary Examiner* — David V Henze
(74) *Attorney, Agent, or Firm* — Paratus Law Group, PLLC

(57) ABSTRACT

A charging control device for controlling charging of a battery that is mounted on a vehicle and is configured to be charged with electric power from an external power supply, the charging control device including: processing circuitry configured to: acquire a remaining charging time from a current time to a charging completion time of the battery; acquire a position of a user terminal operated by a user of the vehicle; acquire a travel time required for the user to move from the position of the user terminal to the vehicle; and notify the user terminal of charging completion information of the battery based on the remaining charging time and the travel time.

11 Claims, 6 Drawing Sheets

DISTANCE OF SIX MINUTES BY WALK

(56)     References Cited

U.S. PATENT DOCUMENTS

| | | | | |
|---|---|---|---|---|
| 2013/0110296 A1* | 5/2013 | Khoo | .................. | G06Q 20/409 |
| | | | | 700/286 |
| 2013/0162027 A1 | 6/2013 | Yamamoto et al. | | |
| 2017/0282736 A1* | 10/2017 | Goei | .................. | G01C 21/3469 |
| 2020/0309562 A1 | 10/2020 | Zhong et al. | | |
| 2021/0133665 A1 | 5/2021 | Hsiao et al. | | |

FOREIGN PATENT DOCUMENTS

| | | | |
|---|---|---|---|
| CN | 111284358 A | 6/2020 | |
| JP | 2012-060834 A | 3/2012 | |
| JP | 2016-090294 A | 5/2016 | |
| JP | 6526300 B1 | 6/2019 | |
| JP | 2020-022110 A | 2/2020 | |
| JP | 2020-159749 A | 10/2020 | |
| JP | 2020-171122 A | 10/2020 | |
| JP | 2020-194362 A | 12/2020 | |
| JP | 2021-193376 A | 12/2021 | |
| WO | WO 2013/137180 A | 9/2013 | |

OTHER PUBLICATIONS

Sep. 19, 2023, translation of Japanese Office Action issued for related JP Application No. 2022-016700.
Jan. 7, 2026, Translation of Chinese Office Action issued for related CN Application No. 202310089288.3.

* cited by examiner

60

DISTANCE OF SIX
MINUTES BY WALK

50

10

CHARGING CONTROL DEVICE AND CHARGING CONTROL METHOD

CROSS REFERENCE TO RELATED APPLICATIONS

This application claims priority to Japanese Patent Application No. 2022-016700 filed on Feb. 4, 2022, the contents of which are incorporated herein by reference.

TECHNICAL FIELD

The present invention relates to a charging control device and a charging control method for controlling charging of a battery mounted on a vehicle.

BACKGROUND ART

In recent years, as a specific measure against climate change of the earth, efforts to realize a low-carbon society or a decarbonized society have been actively made. In vehicles, a reduction in $CO_2$ emission is strongly required, and a driving source is rapidly electrified. Specifically, a vehicle such as an electrical vehicle or a hybrid electrical vehicle has been developed which includes an electric motor as the driving source of the vehicle, and a battery as a secondary battery capable of supplying electric power to the electric motor.

In such a vehicle, normal charging in which a battery is charged by being connected to an external power supply provided in a charging station or rapid charging in which a current larger than that in the normal charging flows through the battery to charge the battery can be performed (JP2012-60834A and JP2020-159749A).

When the battery is being charged at the charging station, if the user does not return to the vehicle even at a time when the charging of the battery is finished, a charging congestion may occur in which another user waiting for charging is caused to wait.

An object of the present invention is to provide a charging control device and a charging control method capable of avoiding a charging congestion of a vehicle.

SUMMARY OF INVENTION

According to an aspect of the present invention, there is provided a charging control device for controlling charging of a battery that is mounted on a vehicle and is configured to be charged with electric power from an external power supply, the charging control device including:

processing circuitry configured to:
  acquire a remaining charging time from a current time to a charging completion time of the battery.
  acquire a position of a user terminal operated by a user of the vehicle;
  acquire a travel time required for the user to move from the position of the user terminal to the vehicle; and
  notify the user terminal of charging completion information of the battery based on the remaining charging time and the travel time.

According to another aspect of the present invention, there is provided a charging control method for controlling charging of a battery that is mounted on a vehicle and can be charged with electric power from an external power supply, the charging control method including:

acquiring a remaining charging time from a current time to a charging completion time of the battery;

acquiring a position of a user terminal operated by a user of the vehicle;

acquiring a travel time required for the user to move from the position of the user terminal to the vehicle; and notifying the user terminal of charging completion information of the battery based on the remaining charging time and the travel time.

DESCRIPTION OF EMBODIMENTS

Hereinafter, an embodiment of a charging control device of the present disclosure will be described with reference to the accompanying drawings.

[Vehicle]

Figure 1:
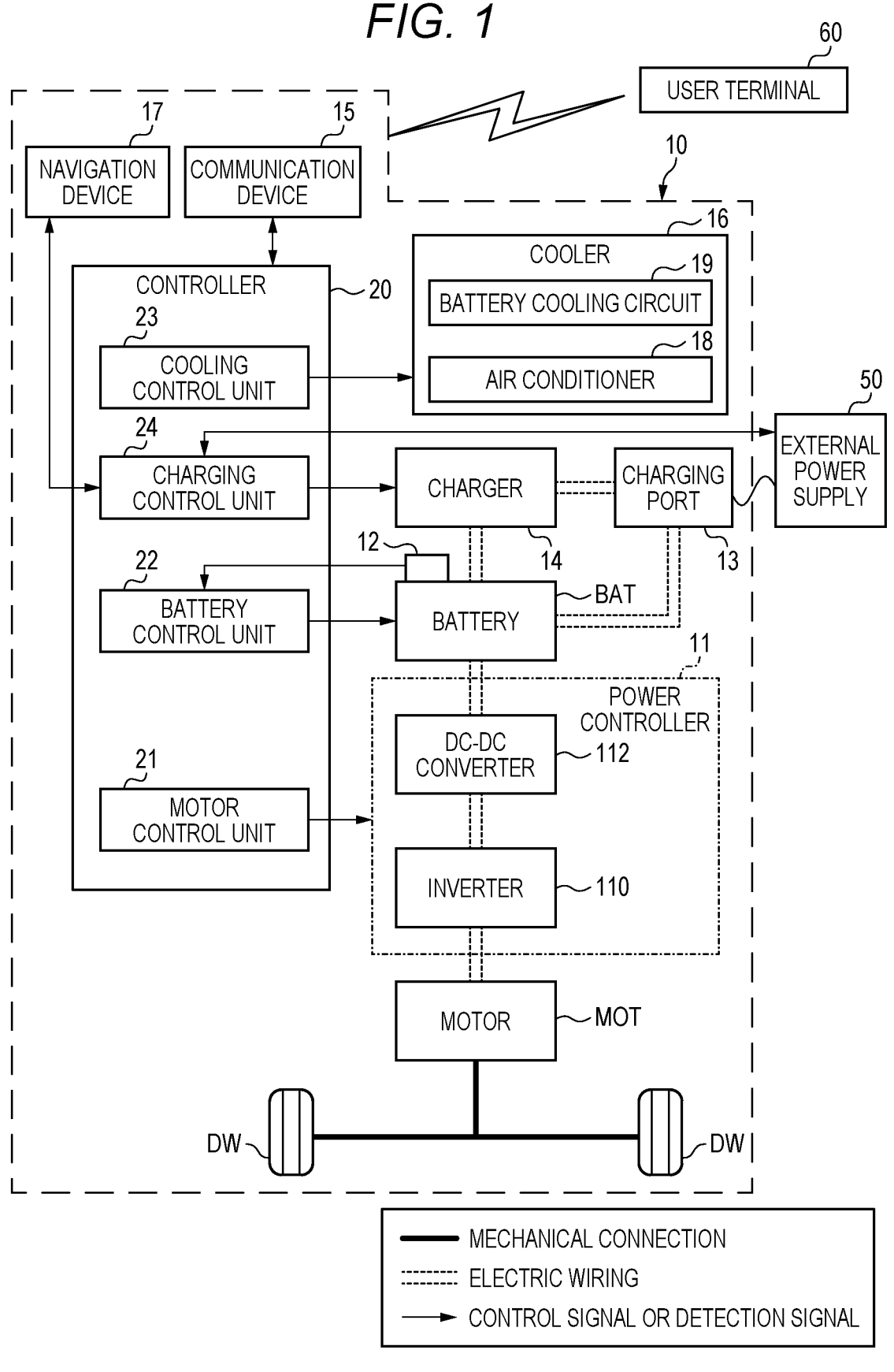
FIG. 1 is a block diagram illustrating an example of a schematic configuration of a vehicle 10.

FIG. 1 is a diagram illustrating a configuration of a vehicle 10 on which the charging control device of the present disclosure is mounted. The vehicle 10 includes, for example, a motor MOT, driving wheels DW, a power controller 11, a battery BAT, a battery sensor 12, a charging port 13, a charger 14, a communication device 15, a cooler 16, a navigation device 17, and a controller 20. The charging control unit 24 included in the controller 20 is an example of the charging control device of the present disclosure, of which details will be described later. In FIG. 1, a thick solid line indicates mechanical connection, a double dotted line indicates electric wiring, and a thin solid line arrow indicates a control signal or a detection signal. The control signal or the detection signal is transmitted through such as a serial communication line, a wireless communication network, or a multiplex communication line such as a controller area network (CAN) communication line. The configuration illustrated in FIG. 1 is an example, and a part of the configuration may be omitted or another configuration may be added.

The motor MOT is, for example, a three-phase alternating current motor. An output of the motor MOT is transmitted to the driving wheels DW, and power is generated using kinetic energy of the vehicle during deceleration of the vehicle.

The power controller 11 includes, for example, an inverter 110 and a DC-DC converter 112. The DC-DC converter 112 steps up the electric power supplied from the battery BAT and outputs the stepped-up electric power to the inverter 110, and steps down the electric power supplied from the inverter 110 and outputs the stepped-down electric power to the battery BAT. The inverter 110 converts a direct current supplied from the DC-DC converter 112 into an alternating current and outputs the alternating current to the motor MOT, and converts an alternating current generated by the motor MOT into a direct current and outputs the direct current to the DC-DC converter 112.

The battery BAT is, for example, a secondary battery such as a lithium ion battery. The battery BAT is charged with electric power introduced from an external power supply 50 outside the vehicle 10, for example, a rapid charger provided in a parking area of an expressway or the like. The battery BAT mainly supplies the electric power to the motor MOT. The battery sensor 12 includes, for example, a voltage sensor, a current sensor, a temperature sensor, and the like. The voltage sensor, the current sensor, and the temperature sensor detect a current value, a voltage value, and a temperature of the battery BAT, respectively. The battery sensor 12 outputs the detected current value, voltage value, temperature, or the like to the controller 20.

The charging port 13 is connected to (plugged in) the external power supply 50 via a charging cable. The connection between the vehicle 10 and the external power supply 50 is not limited thereto. For example, the vehicle 10 may be provided with a power receiving coil or the like that can contactlessly receive electric power transmitted from the external power supply 50.

The charger 14 is provided between the battery BAT and the charging port 13. The charger 14 converts a current introduced from the external power supply 50 via the charging port 13, for example, an alternating current at the time of normal charging, into a direct current. The charger 14 outputs the converted direct current to the battery BAT.

The communication device 15 includes a wireless module for connecting a cellular network or a Wi-Fi network. The communication device 15 is, for example, a communication interface that communicates with a user terminal 60 (for example, a smartphone or a tablet terminal) operated by a user of the vehicle 10 via a network such as the Internet or Ethernet.

The cooler 16 includes an air conditioning device (air conditioner) 18 that adjusts a state of air in a vehicle cabin, and a battery cooling circuit 19 that cools the battery BAT. The air conditioner 18 and the battery cooling circuit 19 are operated by the electric power from at least one of the battery BAT and the external power supply 50. The battery cooling circuit 19 may cool the charger 14 and the power controller 11 in addition to the battery BAT. In addition, a heater may be provided in the battery cooling circuit 19 to heat the battery BAT. Here, the battery cooling circuit 19 is an example of a "battery temperature control device" according to the present disclosure.

The navigation device 17 includes a global positioning system (GPS) unit, map data, a display, an operation unit (touch panel or the like), and the like. The navigation device 17 acquires position information of the vehicle 10 that has received a GPS signal.

The controller 20 includes a motor control unit 21, a battery control unit 22, a cooling control unit 23, and the charging control unit 24. The controller 20 is implemented by an electronic control unit (ECU) including a processor, a memory, an interface, and the like. The motor control unit 21, the battery control unit 22, the cooling control unit 23, and the charging control unit 24 may be configured as separate control devices.

The motor control unit 21 controls the motor MOT based on an operation amount of an accelerator pedal. The battery control unit 22 calculates a state of charge (SOC) of the battery BAT based on an output of the battery sensor 12 attached to the battery BAT. The cooling control unit 23 controls the cooler 16 based on the output of the battery sensor 12 in order to cool the battery BAT, and controls the air conditioner 18 in accordance with a user operation. The charging control unit 24 controls charging of the battery BAT.

[Charging Control Unit]

Figure 2:
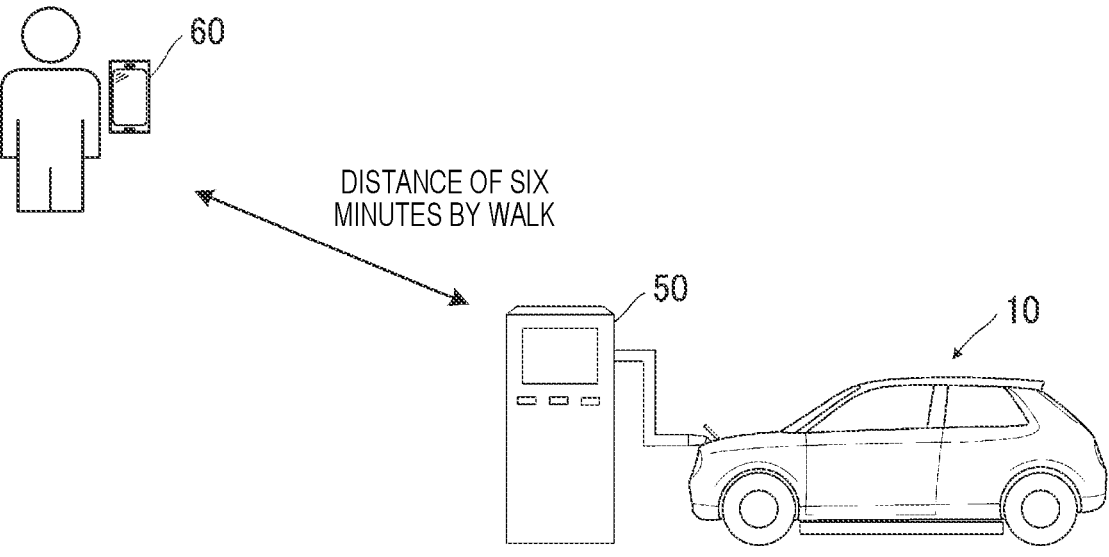
FIG. 2 is a diagram illustrating a positional relation between the vehicle 10 and a user terminal 60 during charging of the vehicle 10.
Figure 3:
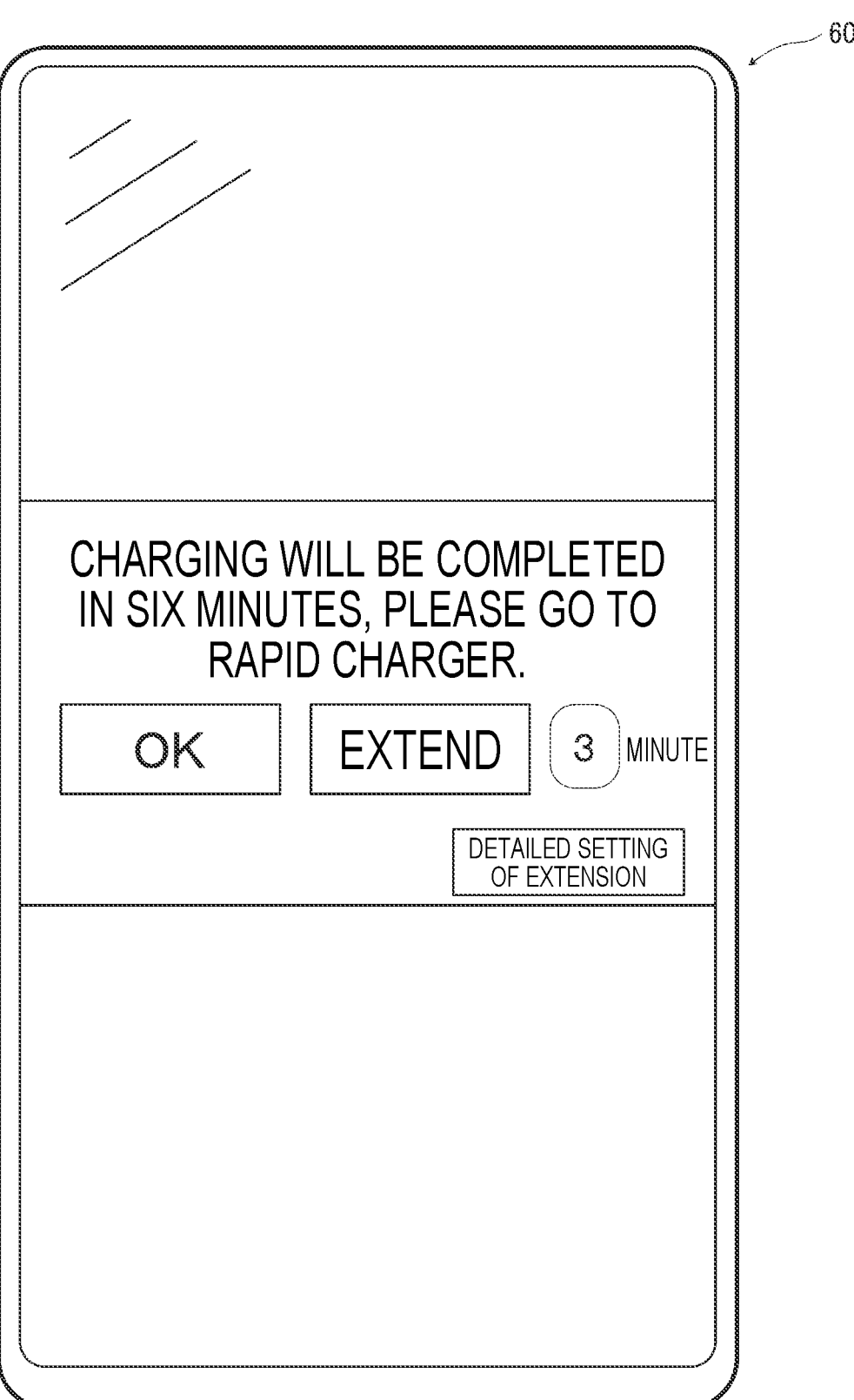
FIG. 3 is a diagram illustrating an example of a screen of the user terminal 60 to which charging completion information is notified.

As illustrated in FIG. 2, while the vehicle 10 is being charged by the external power supply 50 (for example, the rapid charger) provided in the parking area or the like, the user may be at a position away from the vehicle 10. The charging control unit 24 notifies the user terminal 60 of charging completion information at an appropriate timing before the charging is completed. For example, as illustrated in FIG. 3, the charging completion information is displayed on a display of the user terminal 60, and includes information such as a notice prompting the user to return to the vehicle 10, a remaining time from a current time to a charging completion time (hereinafter, also referred to as a remaining charging time), and the charging completion time. By such notification, the user can grasp that the charging is completed soon, and can return to the vehicle 10 around the charging completion time of the vehicle 10.

Figure 4:
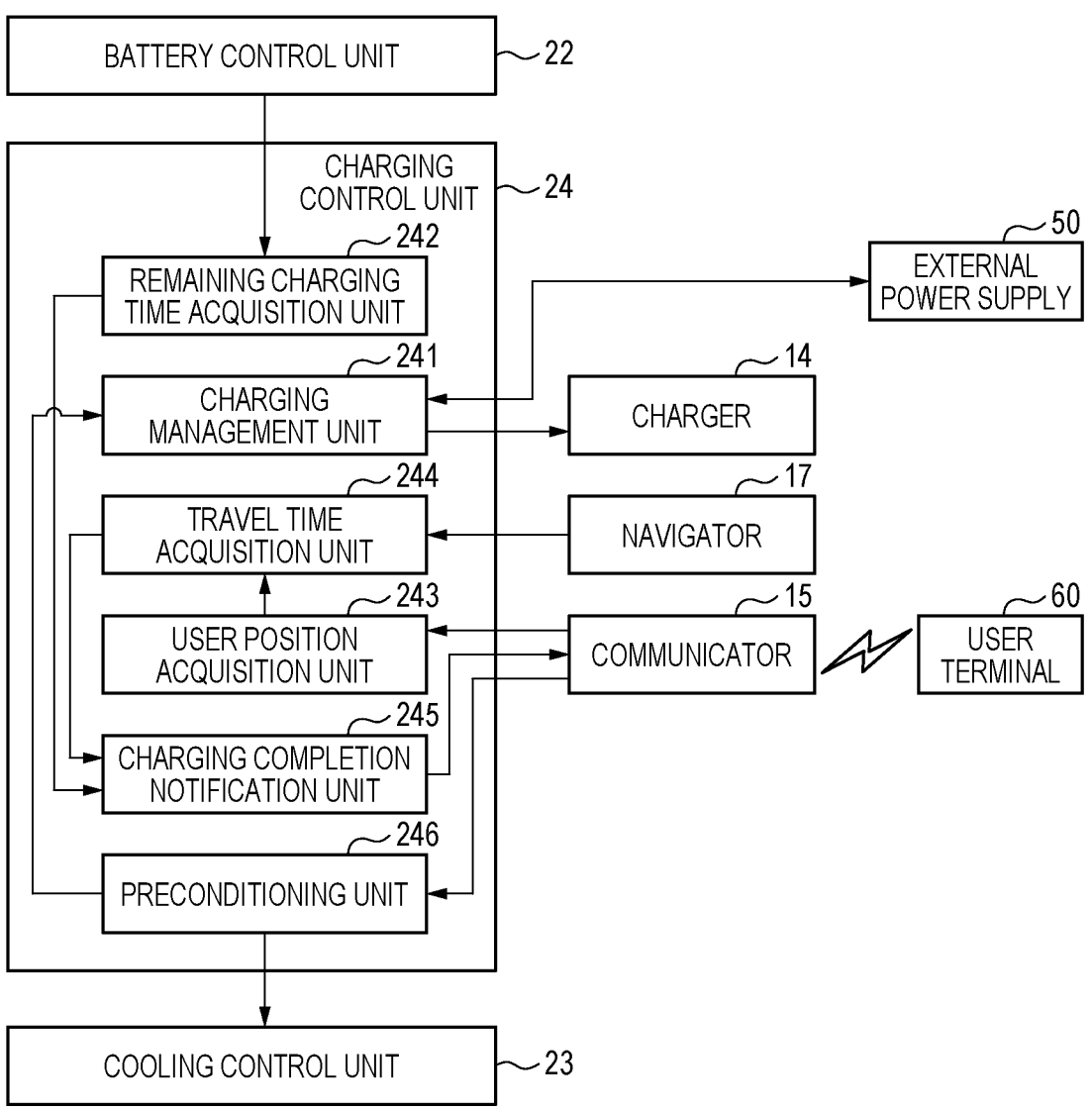
FIG. 4 is a block diagram illustrating an example of a configuration of a charging control unit 24.

Hereinafter, a configuration of the charging control unit 24 will be described with reference to FIG. 4.

The charging control unit 24 includes a charging management unit 241, a remaining charging time acquisition unit 242, a user position acquisition unit 243, a travel time acquisition unit 244, and a charging completion notification unit 245.

The charging management unit 241 manages the charging of the battery BAT by controlling the charger 14 during normal charging and communicating with the external power supply 50 during rapid charging.

The remaining charging time acquisition unit 242 acquires the remaining charging time during the charging of the battery BAT. Specifically, when the battery BAT is charged to an upper limit of the SOC set in advance by the user, the remaining charging time acquisition unit 242 acquires the SOC at the current time from the battery control unit 22, and estimates a time from the current time until the SOC reaches the upper limit of the SOC. When the battery BAT is charged in a predetermined charging time due to a restriction of the external power supply 50 or the like, the remaining charging time acquisition unit 242 estimates a time from the current time to a predetermined charging completion time. Incidentally, a device (for example, the external power supply 50) different from the remaining charging time acquisition unit 242 may estimate the remaining charging time. In this case, the remaining charging time acquisition unit 242 receives and acquires the remaining charging time from the device.

The user position acquisition unit 243 acquires a position of the user terminal 60, that is, a position of the user via the communication device 15. Specifically, the communication device 15 receives position information of the user terminal 60 from the user terminal 60 having a GPS function, and transmits the position information to the user position acquisition unit 243.

The travel time acquisition unit 244 acquires a travel time required for the user to move from the position of the user terminal 60 to the vehicle 10. Specifically, the travel time acquisition unit 244 calculates a distance from the user terminal 60 to the vehicle 10 based on the position information of the user terminal 60 acquired by the user position acquisition unit 243 and the position information of the vehicle 10 acquired by the navigation device 17. The distance calculated by the travel time acquisition unit 244 may be a linear distance from the user terminal 60 to the vehicle 10, or may be a distance along a road. Next, the travel time acquisition unit 244 acquires the travel time based on a moving speed of the user set in advance and the distance from the user terminal 60 to the vehicle 10. Incidentally, a device (for example, the user terminal 60) different from the travel time acquisition unit 244 may calculate the distance. In this case, the travel time acquisition unit 244 receives and acquires the distance from the device.

The travel time is, for example, a travel time on foot required for the user to walk to the vehicle 10. The user can set a walking speed (for example, "slow", "normal", or "fast") in advance, and the travel time acquisition unit 244 acquires the travel time on foot based on the walking speed and a walking distance. As a result, it is possible to acquire a travel time on foot corresponding to the walking speed of the user.

The charging completion notification unit 245 notifies the user terminal 60 of the charging completion information of the battery BAT based on the remaining charging time and the travel time. Specifically, before the charging of the battery BAT is completed, the charging completion notification unit 245 determines a timing for notifying the user terminal 60 of the charging completion information (hereinafter, also referred to as a notification timing) by comparing the remaining charging time and the travel time, and notifies the user terminal 60 of the charging completion information at the notification timing.

The notification timing is, for example, a timing at which the remaining charging time coincides with the travel time. As illustrated in FIG. 2, when the user is at a position where the travel time to the vehicle 10 is six minutes by walk, the charging completion notification unit 245 compares the remaining charging time and the travel time, and notifies the user terminal 60 of the charging completion information as illustrated in FIG. 3 at a timing when the remaining charging time becomes six minutes. On receiving the notification, the user can return to the vehicle 10 at an optimal timing corresponding to a completion of the charging. Here, the "timing at which . . . coincides with . . . " is not limited to a timing at which the remaining charging time strictly coincides with the travel time. For example, a timing at which the remaining charging time becomes a time slightly longer than the travel time (for example, a timing at which the remaining charging time becomes six minutes and ten seconds in FIG. 2) may be set as the notification timing, or a timing at which the remaining charging time becomes a time slightly shorter than the travel time (for example, a timing at which the remaining charging time becomes five minutes and fifty seconds in FIG. 2) may be set as the notification timing.

In this way, since the charging completion information is notified to the user terminal 60, the user can grasp a charging state from a position away from the vehicle 10. Further, since the charging completion information is notified to the user at an appropriate timing in consideration of the travel time for the user, the user can return to the vehicle 10 before the charging is completed or immediately after the charging is completed. Therefore, it is possible to avoid an occurrence of a charging congestion in which another user waiting for charging is caused to wait.

It is preferable that the charging completion notification unit 245 proposes the user to extend the charging of the battery BAT together with notifying the user terminal 60 of the charging completion information. For example, as illustrated in FIG. 3, when the user returns to the vehicle 10 by the charging completion time, the user may touch an icon of "OK", and when desires to extend the charging, the user taps an icon of "EXTEND" displayed on the user terminal 60. When the user selects "EXTEND", the user terminal 60 transmits a signal indicating that the charging by the external power supply 50 is extended to the charging control unit 24. As a result, when the user selects to extend the charging in a case where there is a reason that the user cannot return to the vehicle 10 by the charging completion time, the charging control unit 24 can grasp the extension of charging in advance and execute control capable of effectively utilizing the extension time.

When proposing the user to extend the charging, it is preferable that the charging completion notification unit 245 notifies the user terminal 60 in a format in which the user can set the extension time. For example, as illustrated in FIG. 3, a frame in which the extension time can be set may be provided next to the "EXTEND" icon displayed on the user terminal 60. Incidentally, a method for setting the extension time may adopt any configuration, and may be, for example, a method in which one of predetermined candidates for the extension time (for example, a time from one minute to ten minutes) may be selected, or a method in which the extension time is directly input by the user. As a result, the charging control unit 24 can grasp how much the charging is extended in advance, and can execute control capable of effectively utilizing the extension time.

It is preferable that the charging control unit 24 further includes a preconditioning unit 246 that executes a predetermined preconditioning control on the vehicle 10 such that the electric power from the external power supply 50 can be effectively utilized within the extension time. When the preconditioning unit 246 receives a signal indicating that the user desires to extend the charging and the extension time set by the user from the user terminal 60, the preconditioning unit 246 executes the preconditioning control on the vehicle 10 during the extension time.

An example of the preconditioning control is control on the air conditioner 18. The preconditioning unit 246 transmits an instruction to operate the air conditioner 18 to the cooling control unit 23 using the electric power from the external power supply 50. Accordingly, the cooling control unit 23 causes the air conditioner 18 to operate by using the electric power from the external power supply 50, and adjusts the temperature in the vehicle cabin so as to reach a preset target temperature. The preconditioning unit 246 may execute the control on the air conditioner 18 via the cooling control unit 23 as described above, or may directly execute the control on the air conditioner 18. With such a configuration, when the user selects to extend the charging, the extension time can be effectively utilized for the temperature adjustment of the vehicle cabin by using the electric power from the external power supply 50.

Another example of the preconditioning control is control on the battery cooling circuit 19. The preconditioning unit 246 transmits an instruction to operate the battery cooling circuit 19 to the cooling control unit 23 using the electric power from the external power supply 50. Accordingly, the cooling control unit 23 operates the battery cooling circuit 19 using the electric power from the external power supply 50. Then, the cooling control unit 23 adjusts the temperature of the battery BAT increased due to the rapid charging to a lower target temperature suitable for traveling of the vehicle 10. The preconditioning unit 246 may execute the control on the battery cooling circuit 19 via the cooling control unit 23 as described above, or may directly execute the control on the battery cooling circuit 19. With such a configuration, when the user selects to extend the charging, the extension time can be effectively utilized for the temperature adjustment of the battery BAT by using the electric power from the external power supply 50.

Another example of the preconditioning control is control on the battery BAT. The preconditioning unit 246 transmits an instruction to supply electric power from the external power supply 50 to the battery BAT to the charging management unit 241. Accordingly, the charging management unit 241 further charges the battery BAT to increase the SOC in a manner of exceeding a SOC of the battery BAT reached when the charging is not extended. The preconditioning unit 246 may execute the control on the battery BAT via the charging management unit 241 as described above, or may directly execute the control on the battery BAT. With such a configuration, when the user selects to extend the charging, the extension time can be effectively utilized for further charging of the battery BAT by using the electric power from the external power supply 50.

The preconditioning control may be a combination of the above-described examples.

Figure 5:
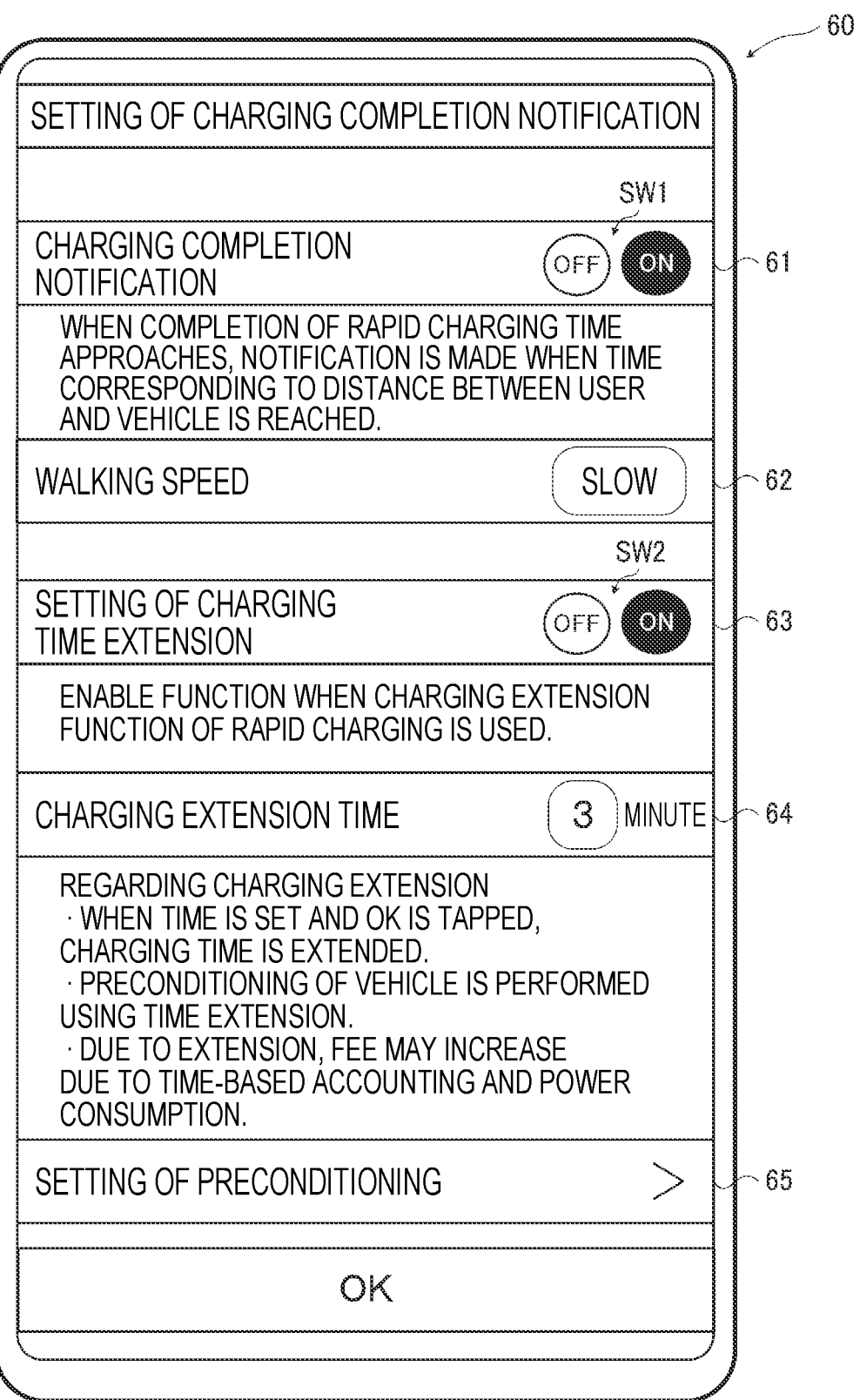
FIG. 5 is a diagram illustrating an example of a screen for setting details of a charging completion notification function and an extension setting function on the user terminal 60.

In addition, it is preferable that details of the charging completion notification function and the extension setting function by the charging control unit 24 can be set by the user terminal 60. FIG. 5 is an example of a screen for setting details relating to the charging completion notification function and the extension setting function in the user terminal 60. The screen in FIG. 5 is displayed, for example, by activating an application for a charging completion notification installed in the user terminal 60, or by touching an icon of "detailed setting of extension" in FIG. 3.

In a region 61, a switch SW1 capable of setting whether to perform notification of the charging completion information during the charging of the vehicle 10 is displayed. In FIG. 5, the switch SW1 is ON.

In a region 62, the walking speed of the user can be set. For example, the user selects one among "slow", "normal", and "fast" as the walking speed.

In a region 63, a switch SW2 capable of setting whether to propose the charging extension together with the notification of the charging completion information is displayed. The switch SW2 is operable when the switch SW1 is ON. In FIG. 5, the switch SW2 is ON.

In a region 64, the extension time can be set. The method for setting the extension time may adopt any configuration as described above. The extension time can be set when the switch SW2 is ON. In addition, in the region 64, a notice may be displayed, indicating that due to the extension of charging, a usage fee of the external power supply 50 may increase due to a time-based accounting or an increase in power consumption, and the user may be urged to pay attention to the extension.

In a region 65, a preconditioning control within the extension time can be set. In the example in FIG. 5, when the user touches the region 65, another screen is displayed, and the preconditioning control can be set according to a desire of the user.

Figure 6:
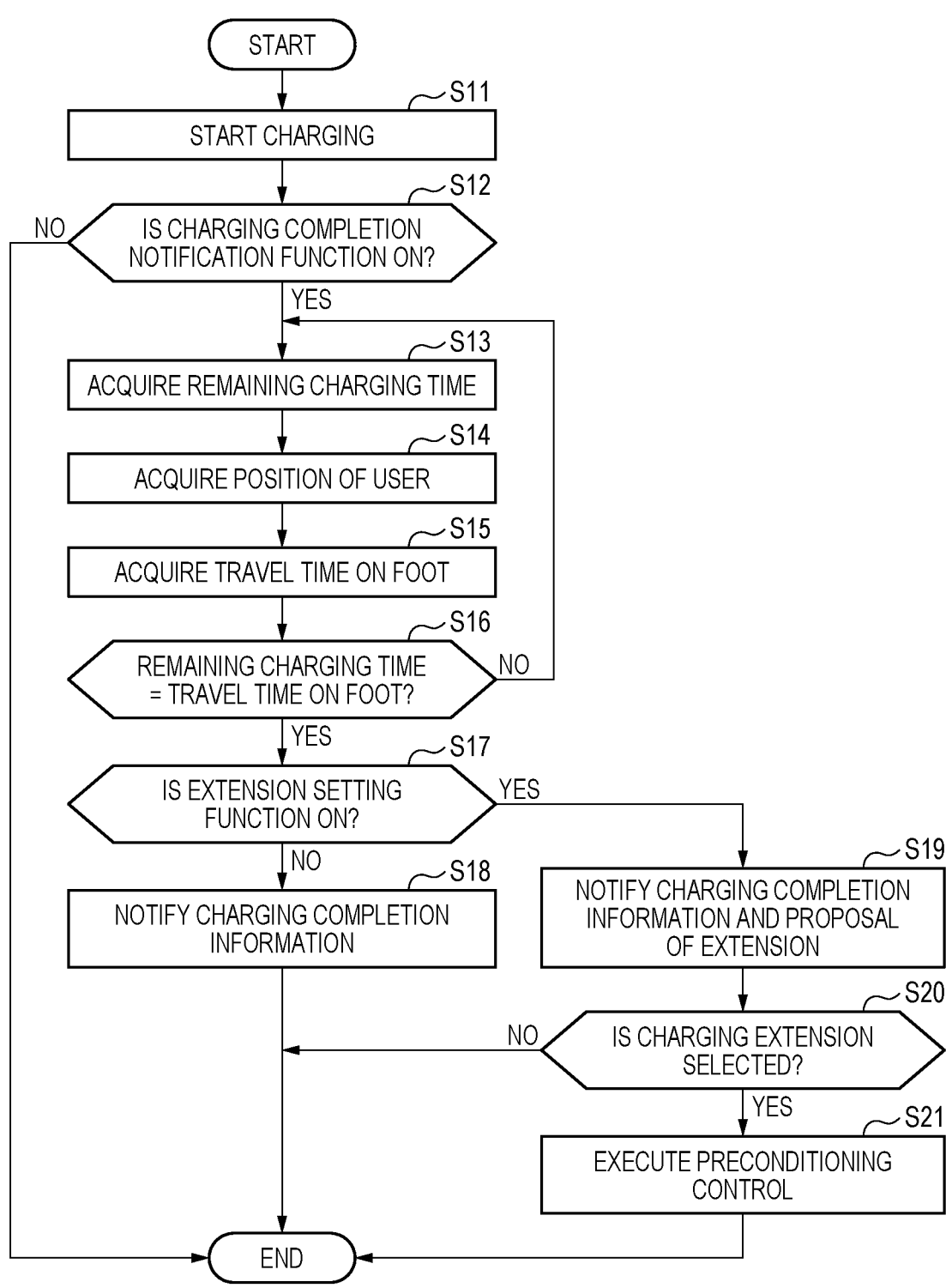
FIG. 6 is a flowchart illustrating control by the charging control unit 24 for performing charging completion notification and charging extension.

FIG. 6 is a flowchart illustrating control by the charging control unit 24 for performing the charging completion notification and the charging extension.

First, the charging management unit 241 starts charging when the charging cable is connected to the charging port 13 (step S11). Next, the charging management unit 241 determines whether the charging completion notification function is ON (step S12). Specifically, when the charging management unit 241 receives that the switch SW1 is ON in the region 61 of the user terminal 60, the charging completion notification function is determined to be ON (YES in step S12), and the process proceeds to step S13. On the other hand, when the charging completion notification function is OFF (NO in step S12), the control ends.

Subsequently, the remaining charging time acquisition unit 242 acquires the remaining charging time (step S13). The user position acquisition unit 243 acquires the position of the user terminal 60, that is, the position of the user (step S14). The travel time acquisition unit 244 acquires the travel time on foot based on the position information of the user terminal 60 acquired by the user position acquisition unit 243 and the position information of the vehicle 10 acquired by the navigation device 17 (step S15). The charging completion notification unit 245 determines whether the remaining charging time coincides with the travel time on foot (step S16). When the remaining charging time coincides with the travel time on foot (YES in step S16), the process proceeds to step S17. On the other hand, when the remaining charging time does not coincide with the travel time on foot (NO in step S16), the process returns to step S13, the remaining charging time and the travel time on foot are acquired again and updated in steps S13 to S15, and monitoring is performed until the remaining charging time coincides with the travel time on foot in step S16.

The charging completion notification unit 245 determines whether the extension setting function is ON (step S17). Specifically, when the charging completion notification unit 245 receives that the switch SW2 is ON in the region 63 of the user terminal 60, the extension setting function is determined to be ON (YES in step S17), and the process proceeds to step S19. On the other hand, when the extension setting function is OFF (NO in step S17), the charging completion notification unit 245 notifies the user terminal 60 of the charging completion information (step S18), and the control ends.

In step S19, the charging completion notification unit 245 notifies the user terminal 60 of a proposal of the charging extension together with the charging completion information. Next, the charging completion notification unit 245 determines whether the user has selected the charging extension (step S20). For example, when the user touches the icon "OK" on the screen of the user terminal 60 in FIG. 3 and does not select the charging extension (NO in step S20), the control ends. On the other hand, when the user touches "EXTEND" to select the charging extension (YES in step S20), the preconditioning unit 246 executes the preconditioning control set in advance in the user terminal 60 during the extension time (step S21).

Although embodiments for carrying out the present disclosure have been described above using the embodiment, the present disclosure is by no means limited to these embodiments, and various modifications and substitutions can be made without departing from the gist of the present disclosure.

In the above-described embodiment, the notification timing is set to the timing at which the remaining charging time coincides with the travel time, but the notification timing is not limited thereto. The notification timing may be set to a timing when the remaining charging time coincides with a time (that is, eight minutes) obtained by adding a predetermined time (for example, two minutes) to the travel time (for example, six minutes), that is, a timing when a difference between the remaining charging time and the travel time becomes the predetermined time. With such a configuration, it is possible to notify the user of the charging completion information in good time from the notification to the user terminal 60 to the charging completion time. The predetermined time may be set to any value, for example, may be three minutes, or may be zero minutes (this case is equivalent to a case where the timing at which the remaining charging time coincides with the travel time is the notification timing).

In the above-described embodiment, as a notification unit for the user, a configuration in which the charging completion information is displayed on the display of the user terminal 60 is illustrated, but a configuration in which the charging completion information is notified to the user by sound or vibration emitted by the user terminal 60 may be adopted.

In the above-described embodiment, the movement of the user is walking, but the movement of the user is not limited to walking. In a case where the user moves using a movement unit such as a wheelchair, the travel time may be calculated in consideration of this case.

In the above-described embodiment, the external power supply 50 is a rapid charger, but the external power supply 50 may be a charger that performs normal charging.

The charging completion information notified to the user terminal 60 may include the travel time, and at least one of the remaining charging time and the charging completion time. By also notifying the user of the travel time, the user can grasp a moving time from a current position to the vehicle 10.

When the charging control unit 24 receives the signal indicating that the user desires to extend the charging or the extension time set by the user from the user terminal 60, the charging control unit 24 may display the extension of charging or the extension time on a display or the like of the external power supply 50. In this case, it is possible to notify another user waiting for charging of the charging state of the vehicle 10, which can contribute in avoiding troubles between the users.

Further, at least the following matters are described in the present description. Although corresponding constituent elements and the like in the above embodiment are shown in parentheses, the present disclosure is not limited thereto.

(1) A charging control device (charging control unit 24) for controlling charging of a battery (battery BAT) that is mounted on a vehicle (vehicle 10) and can be charged with electric power from an external power supply (external power supply 50), the charging control device including:

a remaining charging time acquisition unit (remaining charging time acquisition unit 242) that acquires a remaining charging time from a current time to a charging completion time of the battery;

a user position acquisition unit (user position acquisition unit 243) that acquires a position of a user terminal (user terminal 60) operated by a user of the vehicle;

a travel time acquisition unit (travel time acquisition unit 244) that acquires a travel time required for the user to move from the position of the user terminal to the vehicle; and a charging completion notification unit (charging completion notification unit 245) that notifies the user terminal of charging completion information of the battery based on the remaining charging time and the travel time.

According to (1), since the charging completion notification unit notifies the user terminal of the charging completion information of the battery based on the remaining charging time and the travel time, it is possible to notify the user of the charging completion information at an appropriate timing in consideration of the travel time for the user. Therefore, the user can return to the vehicle before the charging is completed or immediately after the charging is completed, and it is possible to avoid an occurrence of a charging congestion in which another user waiting for charging is caused to wait.

(2) The charging control device according to (1), in which the charging completion notification unit notifies the user terminal of the charging completion information when the remaining charging time coincides with the travel time.

According to (2), since the charging completion notification unit notifies the user terminal of the charging completion information when the remaining charging time coincides with the travel time, the user can return to the vehicle at an optimum timing corresponding to the completion of the charging.

(3) The charging control device according to (1), in which the charging completion notification unit notifies the user terminal of the charging completion information when a difference between the remaining charging time and the travel time becomes a predetermined time.

According to (3), since the charging completion notification unit notifies the user terminal of the charging completion information when the difference between the remaining charging time and the travel time becomes the predetermined time, it is possible to notify the user of the charging completion information in good time.

(4) The charging control device according to any one of (1) to (3), in which the travel time is a travel time on foot required for the user to walk from the position of the user terminal to the vehicle.

According to (4), it is possible to notify the user of the charging completion information at an appropriate timing in consideration of the travel time on foot for the user.

(5) The charging control device according to any one of (1) to (4), in which the travel time acquisition unit acquires the travel time based on a moving speed set in advance by the user.

According to (5), since the travel time acquisition unit acquires the travel time based on the moving speed set in advance by the user, it is possible to acquire the travel time in accordance with the moving speed of the user.

(6) The charging control device according to any one of (1) to (5), in which the charging completion information includes the travel time, and at least one of the remaining charging time and the charging completion time.

According to (6), since the user is also notified of the travel time, the user can grasp the travel time from the current position to the vehicle.

(7) The charging control device according to any one of (1) to (6), in which the charging completion notification unit proposes the user to extend charging of the battery together with notifying the user terminal of the charging completion information.

According to (7), since the charging completion notification unit proposes the user to extend the charging of the battery, the charging completion notification unit can grasp the extension of charging in advance and execute control capable of effectively utilizing the extension time.

(8) The charging control device according to (7), further including:

a preconditioning unit (preconditioning unit 246) that causes an air conditioner (air conditioner 18) to operate by using electric power from the external power supply before the vehicle travels, and adjust a temperature in a vehicle cabin of the vehicle, in which the preconditioning unit adjusts the temperature in the vehicle cabin to a set target temperature when the user selects to extend the charging.

According to (8), by using the preconditioning unit, the extension time can be effectively utilized for the temperature adjustment of the vehicle cabin.

(9) The charging control device according to (7), further including:

a preconditioning unit (preconditioning unit 246) that causes a battery temperature control device (battery cooling circuit 19) to operate by using electric power from the external power supply before the vehicle travels, and adjust a temperature of the battery, in which the preconditioning unit adjusts the temperature of the battery to a target temperature lower than a temperature of the battery at the charging completion time when the user selects to extend the charging.

According to (9), by using the preconditioning unit, the extension time can be effectively utilized for the temperature adjustment of the battery.

(10) The charging control device according to (7), further including:

a preconditioning unit (preconditioning unit 246) that controls a state of charge of the battery by using electric power from the external power supply before the vehicle travels, in which the preconditioning unit supplies, when the user selects to extend the charging, electric power from the external power supply to the battery in a manner of exceeding a state of charge of the battery that is reached when the user does not extend the charging.

According to (10), by using the preconditioning unit, the extension time can be effectively utilized for further charging of the battery.

(11) The charging control device according to any one of (7) to (10), in which the charging completion notification unit acquires an extension time of the charging set by the user when the user selects to extend the charging.

According to (11), since the charging completion notification unit acquires the extension time of the charging set by the user, it is possible to grasp the extension time of the charging in advance and execute control capable of effectively utilizing the extension time.

(12) A charging control method for controlling charging of a battery (battery BAT) that is mounted on a vehicle (vehicle 10) and can be charged with electric power from an external power supply (external power supply 50), the charging control device including:

acquiring a remaining charging time from a current time to a charging completion time of the battery;

acquiring a position of a user terminal (user terminal 60) operated by a user of the vehicle;

acquiring a travel time required for the user to move from the position of the user terminal to the vehicle; and notifying the user terminal of charging completion information of the battery based on the remaining charging time and the travel time.

According to (12), since the charging completion information of the battery is notified to the user terminal based on the remaining charging time and the travel time, it is possible to notify the user of the charging completion information at an appropriate timing in consideration of the travel time for the user. Therefore, the user can return to the vehicle before the charging is completed or immediately after the charging is completed, and it is possible to avoid an occurrence of a charging congestion in which another user waiting for charging is caused to wait.

What is claimed is:

1. A charging control device for controlling charging of a battery that is mounted on a vehicle and is configured to be charged with electric power from an external power supply, the charging control device comprising:

processing circuitry configured to:

acquire a remaining charging time from a current time to a charging completion time of the battery;

acquire a position of a user terminal operated by a user of the vehicle;

acquire a travel time required for the user to move from the position of the user terminal to the vehicle; and notify, before charging of the battery is completed, the user terminal of charging completion estimation information of the battery based on the remaining charging time and the travel time, wherein the processing circuitry is further configured to propose the user to extend charging of the battery together with notifying the user terminal of the charging completion estimation information.

2. The charging control device according to claim 1, wherein the processing circuitry is configured to notify the user terminal of the charging completion estimation information when the remaining charging time coincides with the travel time.

3. The charging control device according to claim 1, wherein the processing circuitry is configured to notify the user terminal of the charging completion estimation information when a difference between the remaining charging time and the travel time becomes a predetermined time.

4. The charging control device according to claim 1, wherein the travel time is a travel time on foot required for the user to walk from the position of the user terminal to the vehicle.

5. The charging control device according to claim 1, wherein the processing circuitry is configured to acquire the travel time based on a moving speed set in advance by the user.

6. The charging control device according to claim 1, wherein the charging completion estimation information includes the travel time, and at least one of the remaining charging time and the charging completion time.

7. The charging control device according to claim 1, wherein the processing circuitry is configured to cause an air conditioner to operate by using electric power from the external power supply before the vehicle travels, and adjust a temperature in a vehicle cabin of the vehicle, and wherein, the processing circuitry is configured to adjust the temperature in the vehicle cabin to a set target temperature when the user selects to extend the charging.

8. The charging control device according to claim 1, wherein the processing circuitry is configured to cause a battery temperature control device to operate by using electric power from the external power supply before the vehicle travels, and adjust a temperature of the battery, and wherein the processing circuitry is configured to adjust the temperature of the battery to a target temperature lower than a temperature of the battery at the charging completion time when the user selects to extend the charging.

9. The charging control device according to claim 1, wherein the processing circuitry is configured to control a state of charge of the battery by using electric power from the external power supply before the vehicle travels, and wherein the processing circuitry is configured to supply, when the user selects to extend the charging, electric power from the external power supply to the battery in a manner of exceeding a state of charge of the battery that is reached when the user does not extend the charging.

10. The charging control device according to claim 1, wherein the processing circuitry is configured to acquire an extension time of the charging set by the user when the user selects to extend the charging.

11. A charging control method for controlling charging of a battery that is mounted on a vehicle and is configured to be charged with electric power from an external power supply, the charging control method comprising:

acquiring a remaining charging time from a current time to a charging completion time of the battery;

acquiring a position of a user terminal operated by a user of the vehicle;

acquiring a travel time required for the user to move from the position of the user terminal to the vehicle;

notifying, before charging of the battery is completed, the user terminal of charging completion estimation information of the battery based on the remaining charging time and the travel time; and proposing the user to extend charging of the battery together with notifying the user terminal of the charging completion estimation information.

* * * * *